United States Patent
Akkarakaran et al.

(10) Patent No.: US 11,153,717 B2
(45) Date of Patent: Oct. 19, 2021

(54) ENHANCED REPORTING OF POSITIONING-RELATED STATES

(71) Applicant: QUALCOMM Incorporated, San Diego, CA (US)

(72) Inventors: Sony Akkarakaran, Poway, CA (US); Tao Luo, San Diego, CA (US); Sven Fischer, Nuremberg (DE)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/823,040

(22) Filed: Mar. 18, 2020

(65) Prior Publication Data
US 2020/0322757 A1 Oct. 8, 2020

Related U.S. Application Data

(60) Provisional application No. 62/829,511, filed on Apr. 4, 2019.

(51) Int. Cl.
*H04W 4/029* (2018.01)

(52) U.S. Cl.
CPC .................... *H04W 4/029* (2018.02)

(58) Field of Classification Search
CPC ......... H04W 4/00; H04W 4/02; H04W 4/021; H04W 4/023; H04W 4/029; H04W 4/40; H04W 4/80; H04W 64/003; H04W 92/18; H04W 92/20; H04W 92/24; G01S 5/0009; G01S 5/0018; G01S 5/0027; G01S 5/0036; G01S 5/0045; G01S 5/0072; G01S 5/009
See application file for complete search history.

(56) References Cited

U.S. PATENT DOCUMENTS

| 8,238,940 B2* | 8/2012 | Loeb ...................... H04W 4/02 455/456.3 |
| 9,832,712 B2* | 11/2017 | Fukuta .................. H04W 48/16 |

(Continued)

OTHER PUBLICATIONS

Fraunhofer IIS: "Movement model based IMU positioning", 3GPP Draft; R2-18G2312, 3rd Generation Partnership Project (3GPP), Mobile Competence Centre ; 650, Route Des Lucioles ; F-06921 Sophia-Antipolis Cedex ; FRANCE, vol. RAN WG2, No. Athens, Greece; Feb. 26, 2018-Mar. 2, 2018 Feb. 15, 2018 (Feb. 15, 2018) (Year: 2018).*

(Continued)

*Primary Examiner* — Jean A Gelin
(74) *Attorney, Agent, or Firm* — Qualcomm Incorporated

(57) ABSTRACT

Various aspects of the present disclosure generally relate to wireless communication. In some aspects, a positioning device may identify a motion state configuration associated with a mobile device, the motion state configuration including information indicating possible positions of the mobile device during a movement of the mobile device; and determine a position of the mobile device based at least in part on the motion state configuration. In some aspects, a device may identify a motion state configuration associated with a mobile device, the motion state configuration including information indicating possible positions of the mobile device during a movement of the mobile device; and provide, to a positioning device, the motion state configuration in association with determining a position of the mobile device. Numerous other aspects are provided.

30 Claims, 9 Drawing Sheets

(56) References Cited

U.S. PATENT DOCUMENTS

| | | | | |
|---|---|---|---|---|
| 10,492,023 | B1* | 11/2019 | Gurin | H04W 4/029 |
| 10,573,152 | B2* | 2/2020 | Humbard | G08B 21/0283 |
| 2007/0057818 | A1* | 3/2007 | Battista | G08G 1/20 |
| | | | | 340/988 |
| 2008/0065269 | A1* | 3/2008 | Hasegawa | B62D 57/032 |
| | | | | 700/260 |
| 2008/0268803 | A1* | 10/2008 | Blin | H04B 17/318 |
| | | | | 455/193.1 |
| 2008/0274752 | A1* | 11/2008 | Houri | H04W 4/023 |
| | | | | 455/456.1 |
| 2012/0086571 | A1* | 4/2012 | Scalisi | G06Q 10/08 |
| | | | | 340/539.13 |
| 2012/0309411 | A1* | 12/2012 | MacGougan | G01S 5/0294 |
| | | | | 455/456.1 |
| 2013/0138246 | A1* | 5/2013 | Gutmann | G05D 1/0274 |
| | | | | 700/253 |
| 2013/0344901 | A1* | 12/2013 | Garin | G01S 5/021 |
| | | | | 455/456.6 |
| 2014/0194115 | A1* | 7/2014 | Yang | H04W 52/0241 |
| | | | | 455/426.1 |
| 2014/0288822 | A1* | 9/2014 | Morrison | G01S 5/0257 |
| | | | | 701/466 |
| 2014/0364149 | A1* | 12/2014 | Marti | G01S 5/0294 |
| | | | | 455/456.3 |
| 2015/0073702 | A1* | 3/2015 | Jouaux | H04W 4/42 |
| | | | | 701/465 |
| 2016/0007152 | A1* | 1/2016 | Johnsson | H04W 72/0473 |
| | | | | 370/329 |
| 2016/0021637 | A1* | 1/2016 | Cao | H04W 64/006 |
| | | | | 455/440 |
| 2016/0091593 | A1* | 3/2016 | Millman | H04W 4/029 |
| | | | | 701/468 |
| 2016/0127486 | A1* | 5/2016 | Chen | G06F 3/04842 |
| | | | | 709/206 |
| 2016/0127871 | A1* | 5/2016 | Smith | G01S 5/0263 |
| | | | | 455/456.6 |
| 2016/0261979 | A1* | 9/2016 | Vaccari | H04W 4/023 |
| 2017/0070856 | A1* | 3/2017 | Kim | H04M 1/72572 |
| 2017/0178498 | A1* | 6/2017 | Mcerlean | G08G 1/166 |
| 2017/0334449 | A1* | 11/2017 | Feifel | G08G 1/163 |
| 2018/0058856 | A1* | 3/2018 | Catherall | H04W 48/04 |
| 2019/0007846 | A1* | 1/2019 | Lee | H04W 28/22 |
| 2019/0053008 | A1* | 2/2019 | He | H04W 4/40 |
| 2019/0082414 | A1* | 3/2019 | Lei | H04W 64/003 |
| 2019/0137595 | A1* | 5/2019 | Choi | G05D 1/0088 |
| 2019/0245592 | A1* | 8/2019 | Chae | H04B 7/0695 |
| 2019/0302220 | A1* | 10/2019 | Kumar | H04W 4/44 |
| 2019/0383625 | A1* | 12/2019 | Oswald | B61L 15/0045 |
| 2020/0070859 | A1* | 3/2020 | Green | G01S 17/58 |
| 2020/0244797 | A1* | 7/2020 | Horelik | H04M 15/39 |
| 2021/0055424 | A1* | 2/2021 | Fowe | G01S 19/07 |
| 2021/0118302 | A1* | 4/2021 | Hamada | G01C 21/3819 |

OTHER PUBLICATIONS

Fraunhofer IIS: "Movement Model based IMU Positioning", 3GPP Draft, 3GPP TSG RAN WG2 Meeting #101, R2-1802312, 3rd Generation Partnership Project (3GPP), Mobile Competence Centre, 650, Route Des Lucioles, F-06921, Sophia-Antipolis Cedex, France, vol. RAN WG2, No. Athens, Greece, Feb. 26, 2018-Mar. 2, 2018, Feb. 15, 2018 (Feb. 15, 2018), XP051399855, 8 Pages, Retrieved from the Internet: URL: http://www.3gpp.org/ftp/tsg%5Fran/WG2%5FRL2/TSGR2%5F101/Docs/, [retrieved on Feb. 15, 2018], Section 5, Section 6.

International Search Report and Written Opinion—PCT/US2020/023535—ISAEPO—dated Jun. 30, 2020.

ITRI: "Discussion on Potential Techniques for NR Positioning", 3GPP Draft, 3GPP TSG RAN WG1 #96bis, R1-1905082, 3rd Generation Partnership Project (3GPP), Mobile Competence Centre, 650, Route Des Lucioles, 7-06921 Sophia-Antipolis Cedex, France, vol. RAN WG1. No. Xi 'An, China, Apr. 8, 2019-Apr. 12, 2019, Apr. 1, 2019 (Apr. 1, 2019), XP051707383, pp. 1-6, Retrieved from the Internet: URL: http://www.3gpp.org/ftp/tsg%5Fran/WG1%5FRL1/TSGR1%5F96b/Docs/R1%2D1905082%2Ezip, [retrieved on Apr. 1, 2019], Section 4.

NEC: "Accuracy of Detailed Location Information", 3GPP draft, 3GPP TSG RAN2 Meeting #78, R2-122885 Detailed Location Info Accuracy, 3rd Generation Partnership Project (3GPP), Mobile Competence Centre, 650, Route Des Lucioles, F-06921 Sophia-Antipolis Cedex, France, vol. RAN WG2. No. Prague, Czech Republic, May 21, 2012-May 25, 2012, May 15, 2012 (May 15, 2012), XP050607449, 3 Pages, [retrieved on May 15, 2012], Section 2, Alt. 2 and Alt. 3.

International Search Report and Written Opinion—PCT/US2020/023535—ISAEPO—dated Oct. 23, 2020.

* cited by examiner

ENHANCED REPORTING OF POSITIONING-RELATED STATES

CROSS-REFERENCE TO RELATED APPLICATION

This patent application claims priority to U.S. Provisional Patent Application No. 62/829,511, filed on Apr. 4, 2019, entitled "ENHANCED REPORTING OF POSITIONING-RELATED STATES," and assigned to the assignee hereof. The disclosure of the prior application is considered part of and is incorporated by reference in this patent application.

FIELD OF THE DISCLOSURE

Aspects of the present disclosure generally relate to wireless communication, and more particularly to techniques and apparatuses for enhanced reporting of positioning-related states.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In some wireless communication systems, such as an LTE system, a mobile device (in other words, a device capable of moving or being moved, such as a UE) can be configured to report information associated with a motion state of the mobile device. Conventional motion states include general states of movement of the mobile device such as, for example, walking, running, fidgeting, in-pocket, on an escalator, or the like. In an LTE system, these conventional motion states can be reported using, for example, LTE positioning protocol (LPP) or an LPP extension (LPPe). Further, in some wireless communication systems, a mobile device can be configured to report information associated with a trajectory of the mobile device (for example, using a Sensor-MotionInformation information element in LPP). Here, the trajectory of the mobile device is reported over time as an ordered list of points, where each point includes information that identifies a time increment and information associated with a position change from a previous point (for example, a bearing, a horizontal distance, a vertical distance, or the like). A positioning device (for example, an evolved serving mobile location center (eSMLC) configured on a base station) can use information associated with the motion state of the mobile device or the trajectory of the mobile device along with one or more other measurements (for example, a downlink time difference of arrival (DL-TDOA), a cell identifier, or the like) to improve accuracy when determining a position of the mobile device. However, in a scenario in which high positioning accuracy is desired, such as in a factory-automation scenario, the use of conventional motion states or trajectory information may not provide sufficient positioning accuracy. Further, in a scenario in which a movement of the mobile device is controlled (such that the movement of the mobile device is known or predictable), such as in a factory automation scenario, additional information regarding the controlled movement of the mobile device may be available. This additional information may enable improved positioning accuracy.

SUMMARY

In some aspects, a method of wireless communication, performed by a positioning device, may include identifying a motion state configuration associated with a mobile device, the motion state configuration including information indicating possible positions of the mobile device during a movement of the mobile device; and determining a position of the mobile device based at least in part on the motion state configuration.

In some aspects, a positioning device for wireless communication may include memory and one or more processors operatively coupled to the memory. The memory and the one or more processors may be configured to identify a motion state configuration associated with a mobile device, the motion state configuration including information indicating possible positions of the mobile device during a movement of the mobile device; and determine a position of the mobile device based at least in part on the motion state configuration.

In some aspects, a non-transitory computer-readable medium may store one or more instructions for wireless communication. The one or more instructions, when executed by one or more processors of a positioning device, may cause the one or more processors to: identify a motion state configuration associated with a mobile device, the motion state configuration including information indicating possible positions of the mobile device during a movement of the mobile device; and determine a position of the mobile device based at least in part on the motion state configuration.

In some aspects, an apparatus for wireless communication may include means for identifying a motion state configuration associated with a mobile device, the motion state configuration including information indicating possible positions of the mobile device during a movement of the mobile device; and means for determining a position of the mobile device based at least in part on the motion state configuration.

In some aspects, a method of wireless communication, performed by a mobile device, may include identifying a motion state configuration associated with the mobile device, the motion state configuration including information indicating possible positions of the mobile device during a movement of the mobile device; and providing, to a positioning device, the motion state configuration in association with determining a position of the mobile device.

In some aspects, a mobile device for wireless communication may include memory and one or more processors operatively coupled to the memory. The memory and the one or more processors may be configured to identify a motion state configuration associated with the mobile device, the motion state configuration including information indicating possible positions of the mobile device during a movement of the mobile device; and provide, to a positioning device, the motion state configuration in association with determining a position of the mobile device.

In some aspects, a non-transitory computer-readable medium may store one or more instructions for wireless communication. The one or more instructions, when executed by one or more processors of a mobile device, may cause the one or more processors to: identify a motion state configuration associated with the mobile device, the motion state configuration including information indicating possible positions of the mobile device during a movement of the mobile device; and provide, to a positioning device, the motion state configuration in association with determining a position of the mobile device.

In some aspects, an apparatus for wireless communication may include means for identifying a motion state configuration associated with the apparatus, the motion state configuration including information indicating possible positions of the apparatus during a movement of the apparatus; and means for providing, to a positioning device, the motion state configuration in association with determining a position of the apparatus.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
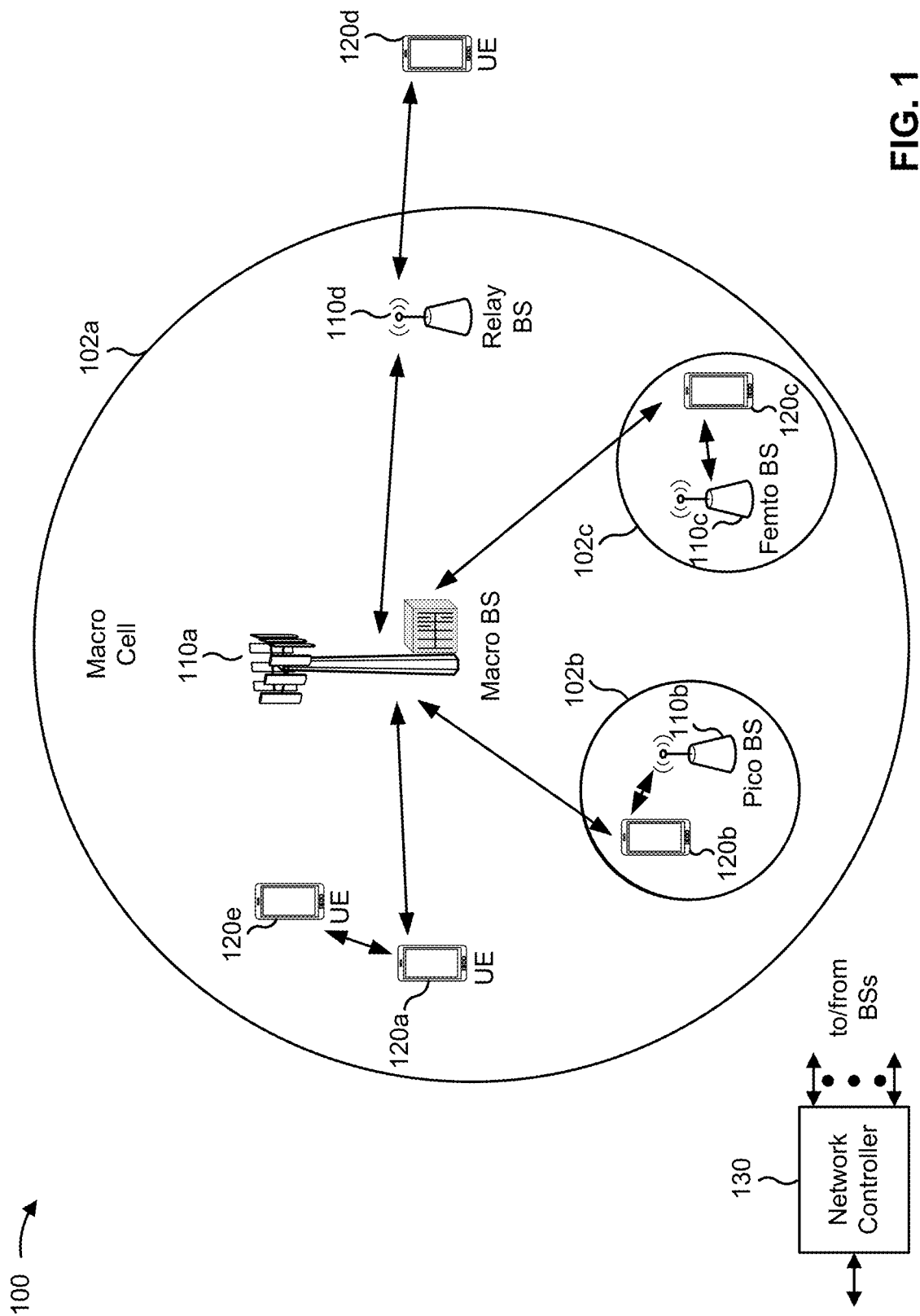
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G or 4G wireless technologies, aspects of the present disclosure can be applied in other generation-based communication systems, such as 5G and later, including NR technologies.

As described above, a mobile device (in other words, a device capable of moving or being moved, such as a user equipment (UE)) can be configured to report information associated with a conventional motion state of the mobile device (for example, walking, running, fidgeting, in-pocket, on an escalator, or the like) or information associated with a trajectory of the mobile device (for example, a bearing from a last point, a horizontal distance from a last point, a vertical distance from a last point, or the like). A positioning device (for example, an evolved serving mobile location center (eSMLC) configured on the UE, on a base station, on a core network device, or the like) can use information associated with the motion state of the mobile device or information associated with the trajectory of the mobile device along with one or more other positioning-related measurements (for example, a downlink time difference of arrival (DL-TDOA), a cell identifier, or the like) to improve accuracy when determining a position of the mobile device.

In some scenarios, a movement of a mobile device is controlled such that, for example, characteristics of the movement (for example, a speed, a position at a given time, a boundary of the movement, or the like) is known or predictable. For example, in a factory-automation scenario, information related to a movement of a mobile device may be available (even without using a sensor) because the mobile device may be configured to move along a configured path, within a configured surface, within a configured volume, or the like. In such a case, a position of the mobile device can be determined when a speed of the mobile device is known. However, the speed of the mobile device may be variable, and the configured path, surface, or volume may be one among a set of possibilities. Further, both the speed and the path, surface, or volume definition may be subject to measurement uncertainties. Notably, a control device (for example, a device associated with controlling or triggering the movement of the mobile device, configured on a UE, a base station, or a core network device) may have information relating to the motion of the mobile device and a target position of the mobile device as a function of time. However, the control device may not have network connectivity that allows the control device to inform other devices regarding the position of the mobile device (for example, in real-time or near real-time), which may be important in, for example, a factory-automation scenario.

As indicated above, additional information regarding a movement of the mobile device is available in a scenario in which the movement of the mobile device is controlled, such as in a factory-automation scenario. Further, in such a scenario, a highest possible positioning accuracy may be desirable (for example, to prevent collisions between mobile devices). Some aspects described herein provide techniques and apparatuses for enhanced reporting of positioning-related states. In some aspects, identifying and reporting a motion state configuration, associated with a movement of a mobile device, can be used to enable improved accuracy in association with determining a position of the mobile device, as described below.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, a virtual network, or the like, or combinations thereof using any suitable transport network.

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like, or combinations thereof.

UEs 120 (for example, 120a, 120b, 120c) may be dispersed throughout wireless network 100, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, actuators, programmable logic circuits (PLCs), meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like, or combinations thereof), a mesh network, or the like, or combinations thereof. In this case, the UE 120 may perform scheduling operations, resource selection operations, or other operations described elsewhere herein as being performed by the base station 110.

Figure 2:
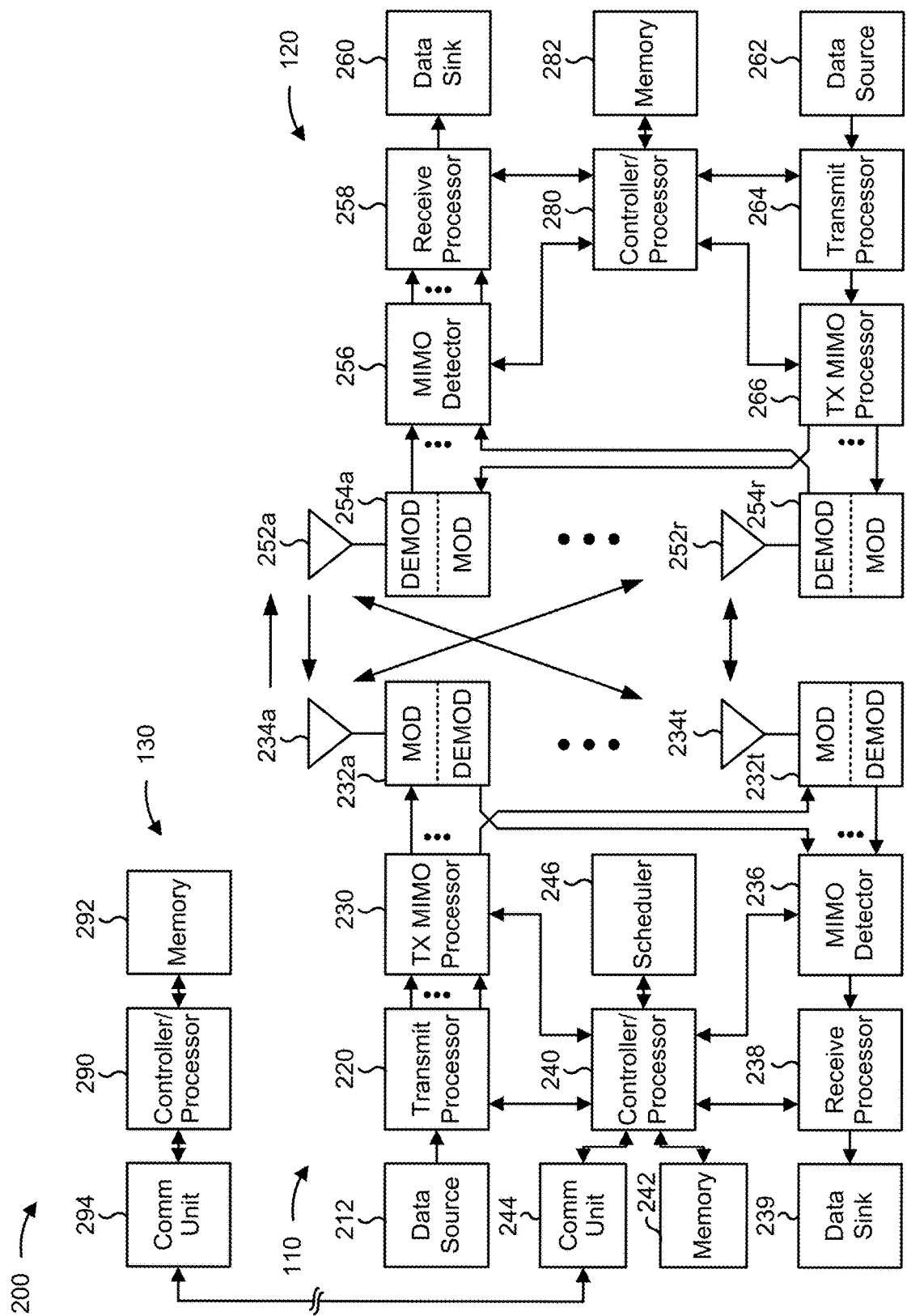
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with enhanced reporting of positioning-related states, as described in more detail elsewhere herein. For example, controller/processor 240 of base station 110, controller/processor 280 of UE 120, or any other component(s) of FIG. 2 may perform or direct operations of, for example, process 600 of FIG. 6, process 700 of FIG. 7, or other processes as described herein. Memories 242 and 282 may store data and program codes for base station 110 and UE 120, respectively. A scheduler 246 may schedule UEs for data transmission on the downlink or uplink.

In some aspects, a positioning device (for example, a UE 120 or a base station 110) may include means for identifying a motion state configuration associated with a mobile device (for example, a UE 120, a base station 110, or the like), the motion state configuration including information indicating possible positions of the mobile device during a movement of the mobile device; means for determining a position of the mobile device based at least in part on the motion state configuration; or the like, or combinations thereof. In some aspects, such means may include one or more components of a wireless communication device (for example, UE 120 or base station 110) described in connection with FIG. 2.

In some aspects, a mobile device (for example, UE 120 or base station 110) may include means for identifying a motion state configuration associated with the mobile device, the motion state configuration including information indicating possible positions of the mobile during a movement of the mobile device; means for providing, to a positioning device (for example, a UE 120, a base station 110, or the like), the motion state configuration in association with determining a position of the mobile device; or the like, or combinations thereof. In some aspects, such means may include one or more components of a wireless communication device (for example, UE 120 or base station 110) described in connection with FIG. 2.

Figure 3:
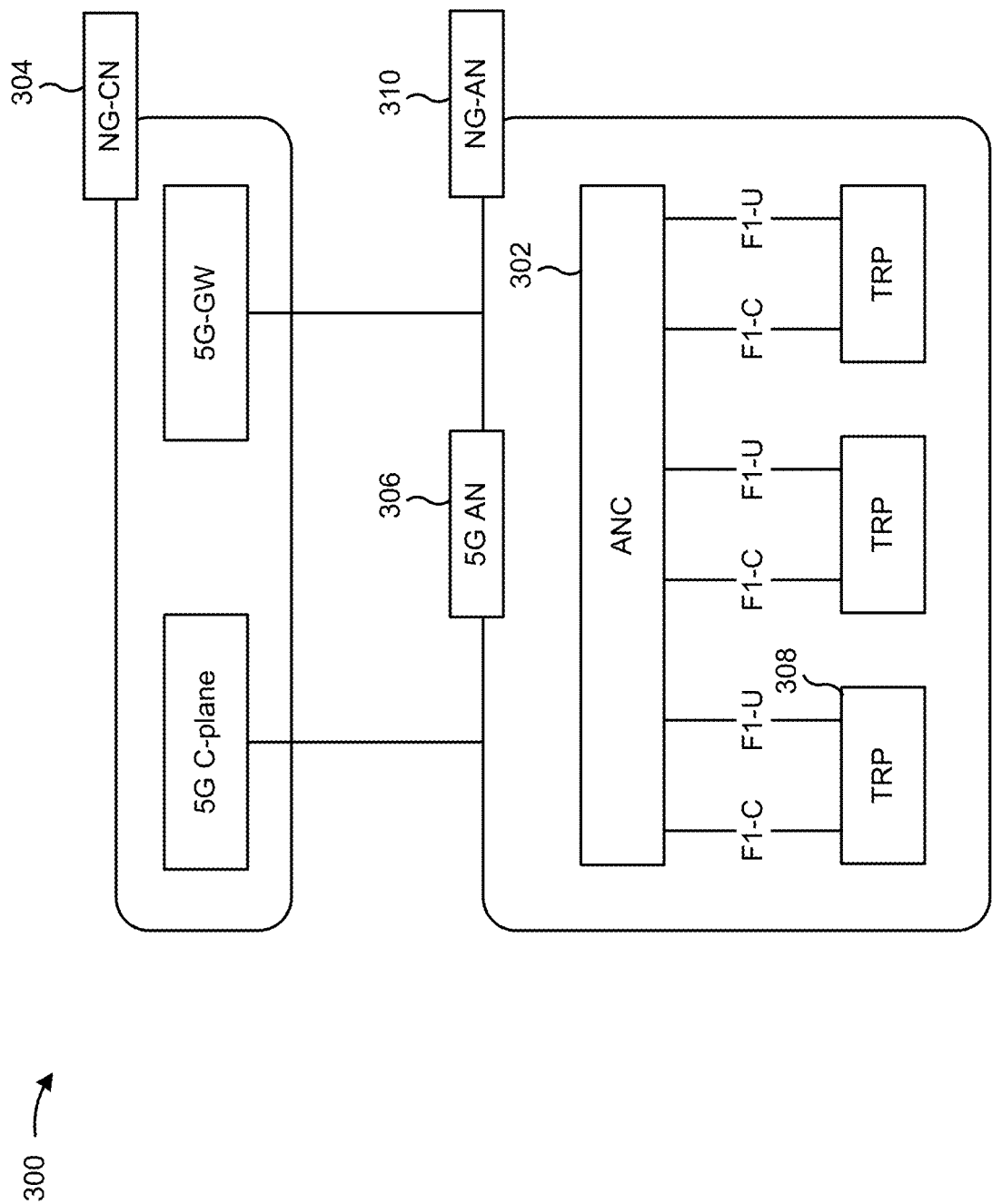
FIG. 3 illustrates an example logical architecture of a distributed radio access network (RAN) in accordance with various aspects of the present disclosure.

FIG. 3 illustrates an example logical architecture of a distributed radio access network (RAN) 300 in accordance with various aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, gNBs, or some other term). As described above, "TRP" may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (for example, dynamic selection) or jointly (for example, joint transmission) serve traffic to a UE.

The local architecture of RAN 300 may be used to support fronthaul definition. The architecture may be defined to support fronthauling solutions across different deployment types. For example, the architecture may be based at least in part on transmit network capabilities (for example, bandwidth, latency, or jitter).

The architecture may share features or components with LTE. In some aspects, NG-AN 310 may support dual connectivity with NR. NG-AN 310 may share a common fronthaul for LTE and NR.

The architecture may enable cooperation between and among TRPs 308. For example, cooperation may be preset within a TRP or across TRPs via the ANC 302. In some aspects, no inter-TRP interface may be needed/present.

In some aspects, a dynamic configuration of split logical functions may be present within the architecture of RAN 300. The packet data convergence protocol (PDCP), radio link control (RLC), and MAC protocol layers may be adaptably placed at the ANC or TRP.

Figure 4:
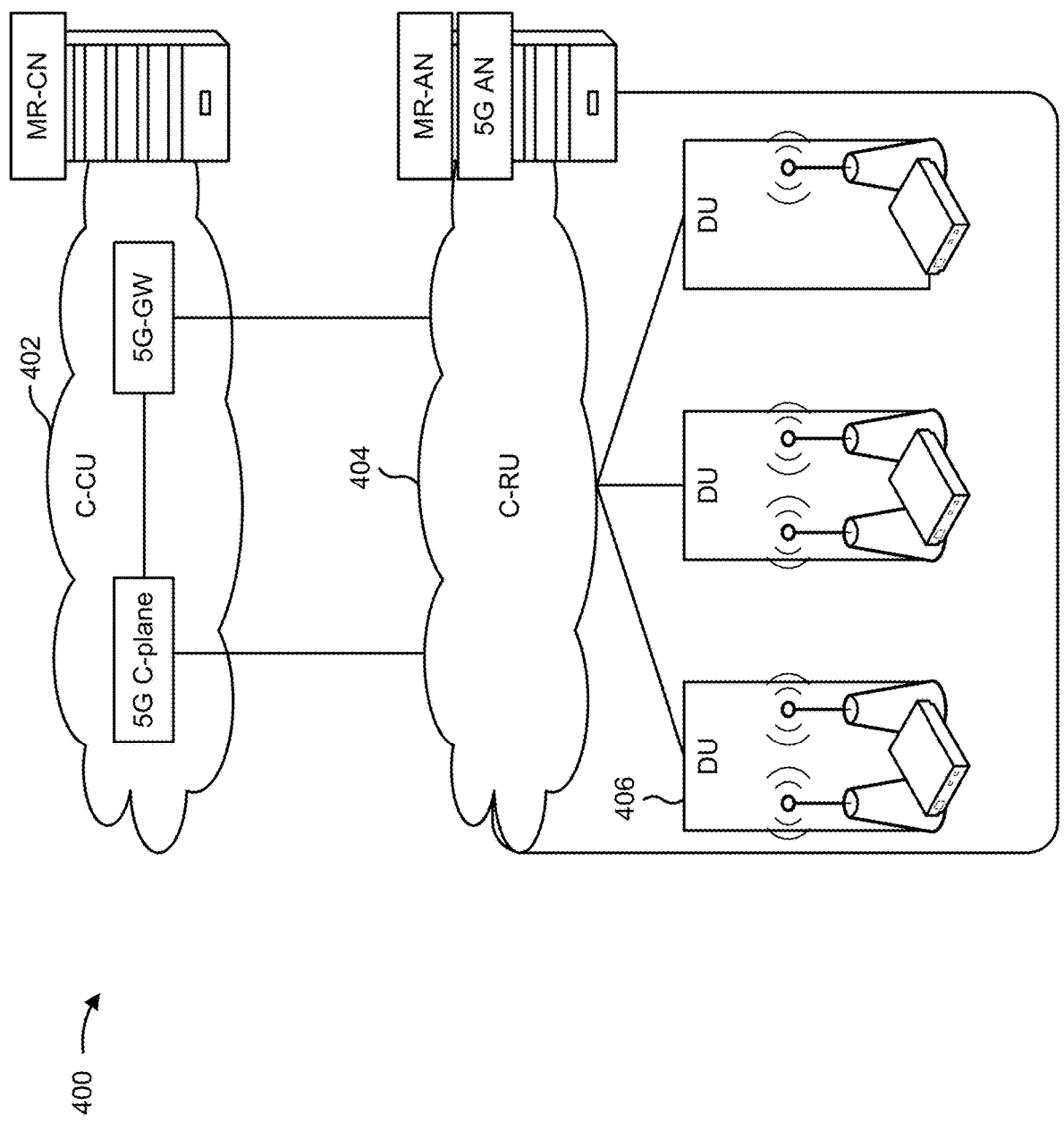
FIG. 4 illustrates an example physical architecture of a distributed RAN in accordance with various aspects of the present disclosure.

FIG. 4 illustrates an example physical architecture of a distributed RAN 400 in accordance with various aspects of the present disclosure. A centralized core network unit (C-CU) 402 may host core network functions. The C-CU may be centrally deployed. C-CU functionality may be offloaded (for example, to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

As described above, a mobile device (in other words, a device capable of moving or being moved, such as a user equipment (UE)) can be configured to report information associated with a conventional motion state of the mobile device (for example, walking, running, fidgeting, in-pocket, on an escalator, or the like) or information associated with a trajectory of the mobile device (for example, a bearing from a last point, a horizontal distance from a last point, a vertical distance from a last point, or the like). Such information could be obtained, for example, based on a sensor such as an accelerometer, a gyroscope, or the like, configured on the mobile device. A positioning device (for example, an evolved serving mobile location center (eSMLC) or a location measurement function (LMF) configured on the UE, on a base station, on a core network device, or the like) can use information associated with the motion state of the mobile device or information associated with the trajectory of the mobile device along with one or more other positioning-related measurements (for example, a downlink time difference of arrival (DL-TDOA), a cell identifier, or the like) to improve accuracy when determining a position of the mobile device.

In some scenarios, a movement of a mobile device is controlled such that, for example, characteristics of the movement (for example, a speed, a position at a given time, a boundary of the movement, or the like) is known or predictable. For example, in a factory-automation scenario, information related to a movement of a mobile device may be available (even without using a sensor) because the mobile device may be configured to move along a configured path, within configured surface, within a configured volume, or the like. In such a case, a position of the mobile device can be determined when a speed of the mobile device is known. However, the speed of the mobile device may be variable, and the configured path, surface, or volume may be one among a set of possibilities. Further, both the speed and the path, surface, or volume definition may be subject to measurement uncertainties. Notably, a control device (for example, a device associated with controlling or triggering the movement of the mobile device, configured on a UE, a base station, or a core network device) may have information relating to the motion of the mobile device and a target position of the mobile device as a function of time. However, the control device may not have network connectivity that allows the control device to inform other devices regarding the position of the mobile device (for example, in real-time or near real-time), which may be important in, for example, a factory-automation scenario.

As indicated above, additional information regarding a movement of the mobile device is available in a scenario in which the movement of the mobile device is controlled, such as in a factory-automation scenario. Further, in such a scenario, a highest possible positioning accuracy may be desirable (for example, to prevent collisions between mobile devices). Some aspects described herein provide techniques and apparatuses for enhanced reporting of positioning-related states. In some aspects, identifying and reporting a motion state configuration, associated with a movement of a mobile device, can be used to enable improved accuracy in association with determining a position of the mobile device, as described below.

Figure 5:
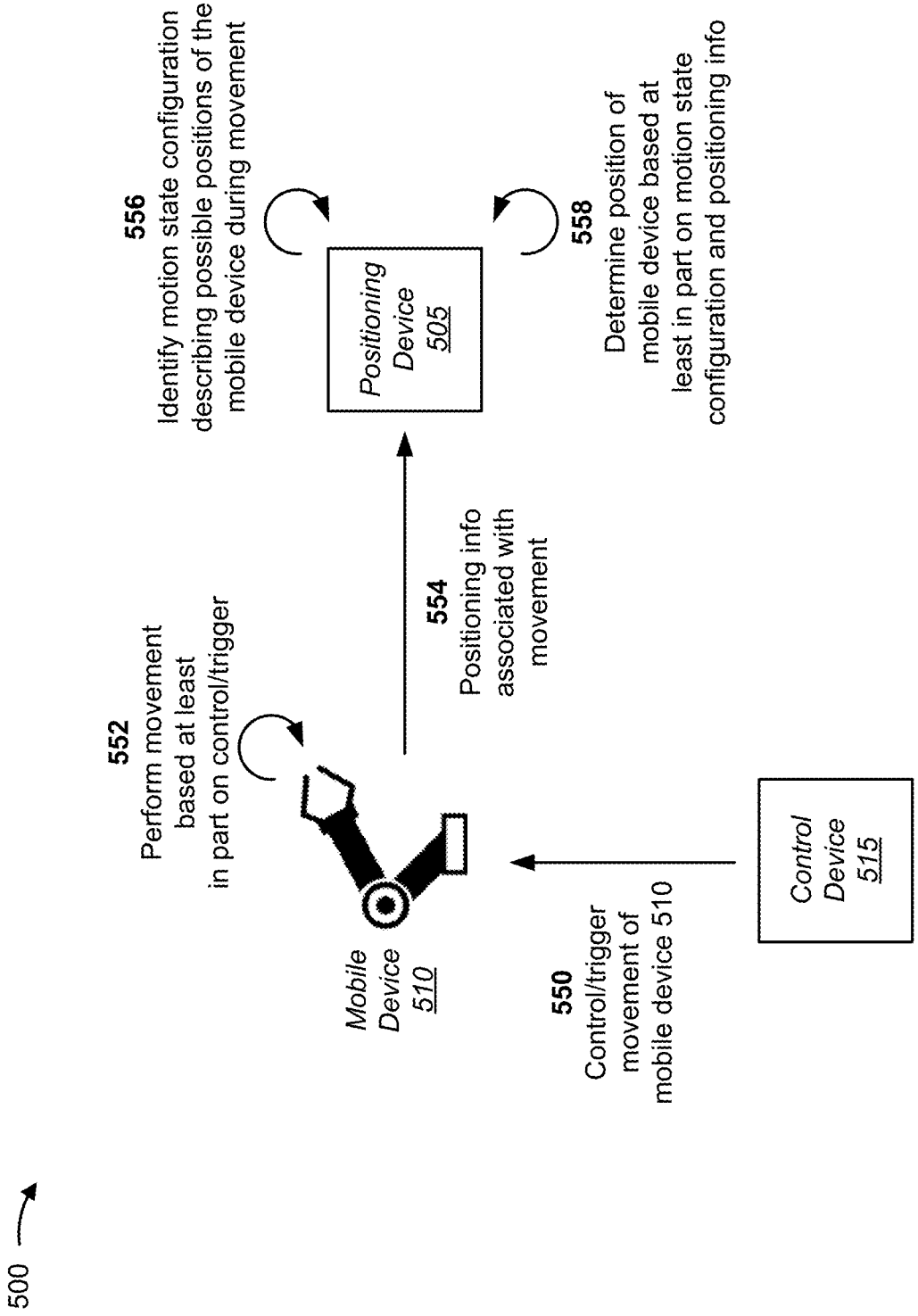
FIG. 5 is a diagram illustrating an example associated with enhance reporting of positioning-related states in accordance with various aspects of the present disclosure.

FIG. 5 is a diagram 500 illustrating an example associated with enhanced reporting of positioning-related states in accordance with various aspects of the present disclosure. In the example shown in FIG. 5, a positioning device 505 is to determine a position of a mobile device 510, a movement of which is controlled or triggered by a control device 515.

Positioning device 505 is a device associated with determining a position of mobile device 510. In some aspects, positioning device 505 is at least partially configured on one or more of a base station (for example, base station 110), a UE (for example, UE 120), or a core network device (for example, a device in a core network associated with base station 110 and UE 120). In some aspects, positioning device 505 may be configured on multiple wireless communication devices (for example, such that different portions of functionality of positioning device 505 are configured on respective different wireless communication devices).

Mobile device 510 is a device, capable of moving or being moved, for which a position may be of interest. In some aspects, mobile device 510 is configured on a UE (for example, the same UE as that on which at least partial functionality of positioning device 505 is configured, or a different UE from that on which the at least partial functionality of positioning device 505 is configured). As an example, in some aspects, positioning device 505 may be configured on a base station, and mobile device 510 may be configured on a UE. As another example, in some aspects, both mobile device 510 and positioning device 505 may be configured on the UE (such that positioning device 505 and mobile device 510 are co-located on the same wireless communication device).

Control device 515 is a device associated with controlling or triggering a movement of mobile device 510. In some aspects, control device 515 may be at least partially configured on one or more of a base station (for example, a base station on which positioning device 505 is at least partially configured, a base station on which positioning device 505 is not configured, or the like), a UE (for example, a UE on which mobile device 510 is configured, or a UE on which mobile device 510 is not configured) a core network device, or the like. As an example, mobile device 510 may be configured on a UE, positioning device 505 may be configured on a first base station, and control device 515 may be at least partially configured on the UE, the first base station, or a second base station. In some aspects, control device 515 may be configured on multiple wireless communication devices (for example, such that different portions of functionality of control device 515 are configured on respective different wireless communication devices).

As shown in FIG. 5, in a first operation 550, control device 515 may control or trigger a movement of mobile device 510. For example, control device 515 may provide, to mobile device 510, a command that causes mobile device 510 to initiate a performance of a movement. In some aspects, information associated with the movement (for example, information that describes a direction, a speed, a target position, or the like, associated with the movement) may be stored or accessible by mobile device 510 (such that control device 515 needs to provide only a trigger to mobile device 510). Additionally or alternatively, control device 515 may provide the information associated with the movement along with the command.

As further shown in FIG. 5, in a second operation 552, mobile device 510 may perform the movement. For example, mobile device 510 may initiate the movement based at least in part on receiving the command provided by control device 515 and (optionally) based at least in part on the information associated with the movement, when such information is provided by control device 515 along with the command.

As further shown in FIG. 5, in a third operation 554, mobile device 510 may provide position information, associated with the movement, to positioning device 505. The position information may include, for example, information that can be used in association with determining a position of mobile device 510, such as information associated with a trajectory of mobile device 510, information associated with a measurement performed by mobile device 510 (for example, a downlink time difference of arrival (DL-TDOA), a cell identifier, or the like), or another type of information. As indicated in FIG. 5, positioning device 505 may receive the position information provided by mobile device 510.

In some aspects, positioning device 505 may be configured to determine a position of mobile device 510. In some aspects, positioning device 505 may determine the position of mobile device 510 based at least in part on a motion state configuration associated with mobile device 510. For example, the positioning device 505 may determine the position of mobile device 510 based on the motion state configuration in combination with the position information received from the mobile device.

In some aspects, the motion state configuration includes information indicating possible positions of mobile device 510 during the movement of mobile device 510. For example, as described above, in some scenarios, a position of mobile device 510 is controlled such that the position of mobile device 510 is known to be on or near a particular (one-dimensional) path, in or near a particular (two-dimensional) surface, or within or near a particular (three-dimensional) volume. An example of such a scenario is a factory-automation scenario. In such a case, the motion state configuration may include information indicating possible positions of mobile device 510 as defined based at least in part on the particular path, surface, or volume on or near which mobile device 510 is to move.

In some aspects, the possible positions, associated with the motion state configuration, include positions within a threshold uncertainty of a set of positions. For example, in some aspects, the possible positions, associated with the motion state configuration, include positions within a threshold uncertainty from at least one path. A path may correspond to, for example, a line between a first point and a second point. As an example, the movement to be performed by mobile device 510 may indicate that mobile device 510 is to move on a straight line between a first point and a second point. Here, the threshold uncertainty is a positioning tolerance for the movement along the straight line and, thus, can be represented by a distance from the straight line connecting the first point and the second point. In this example, the possible positions can be visualized as a cylindrical volume with an axis representing the path between the first point and the second point, and a radius representing the threshold uncertainty. The position of mobile device 510 during the movement should be within the cylindrical volume representing the path and the threshold uncertainty. In some aspects, the threshold uncertainty may vary along the path. In such a case, the possible positions can be visualized as a tapered cylinder (for example, a cylinder with a radius that varies along the axis).

As another example, in some aspects, the possible positions, associated with the motion state configuration, include positions within a threshold uncertainty from a two-dimensional surface (i.e., one or more boundaries of the two-dimensional surface). A surface may correspond to, for example, a two-dimensional plane defined by a group of three or more points. As an example, the movement to be performed by mobile device 510 may indicate that mobile device 510 is to move on a surface defined by four points (for example, a rectangular plane). Here, the threshold uncertainty is a positioning tolerance for the movement on the surface and, thus, can be represented by a distance from a two-dimensional representation of the surface. In this example, the possible positions can be visualized as a three-dimensional rectangle a length and width of which represent the surface, and a height of which represents the threshold uncertainty. The position of mobile device 510 during the movement should be within the three-dimensional rectangle representing the surface and the threshold uncertainty. In some aspects, the threshold uncertainty may vary across the surface.

As another example, in some aspects, the possible positions, associated with the motion state configuration, include positions within a threshold uncertainty from one or more surfaces of a three-dimensional volume (i.e., one or more boundaries of the three-dimensional volume). A volume may correspond to, for example, a three-dimensional space defined by a group of points. As an example, the movement to be performed by mobile device 510 may indicate that mobile device 510 is to move within a space defined by eight points (for example, a cube-shaped space). Here, the threshold uncertainty is a positioning tolerance for the movement within the volume and, thus, can be represented by a distance from one or more surfaces of the three-dimensional space that represents the volume. The position of mobile device 510 during the movement should be within the three-dimensional space representing the volume and the threshold uncertainty. In some aspects, the threshold uncertainty may vary across one or more surfaces of the volume.

In some aspects, a threshold uncertainty, associated with the possible positions, may be based at least in part on a confidence level associated with the possible positions. For example, the threshold uncertainty may be defined by a confidence level that indicates a level of confidence that mobile device 510 will stay on a path, on a surface, or within a volume. Additionally or alternatively, the threshold uncertainty may be defined by a confidence window associated with the possible positions. For example, the threshold uncertainty may be defined by a confidence window that indicates a window of distances from the path, surface, or volume in which mobile device 510 is expected to be positioned. Additionally or alternatively, the threshold uncertainty may be defined by a confidence distribution associated with the possible positions (for example, a mean position with a Gaussian distribution around the mean with a variance of some distance).

In some aspects, the possible positions include a first set of possible positions associated with a first path, surface, or volume and a second set of possible positions associated with a second path, surface, or volume. In other words, the motion state configuration can include information indicating any combination of paths, surfaces, or volumes, each having one or more associated threshold uncertainties. In such a case, the motion state configuration may include probability information associated with the first path, surface, or volume and probability information associated with the second path, surface, or volume. The probability information may include, for example, information indicating a probability that mobile device 510 will, during the movement, move on or within the first path, surface, or volume and a probability that mobile device 510 will, during the movement, move on or within the second path, surface, or volume.

In some aspects, the motion state configuration may include information that identifies a timing uncertainty associated with the movement of mobile device 510. The timing uncertainty may identify, for example, a window of time during which mobile device 510 is expected to be at a particular position. In some aspects, the timing uncertainty may be defined by a confidence level associated with the movement of mobile device 510. For example, the timing uncertainty may be defined by a confidence level that indicates a level of confidence that mobile device 510 will be at a particular position at a particular time. Additionally or alternatively, the timing uncertainty may be defined by a confidence window associated with the movement. For example, the timing uncertainty may be defined by a confidence window that indicates a window of time in which mobile device 510 is expected to be at a particular position associated with the movement. Additionally or alternatively, the timing uncertainty may be defined by a confidence distribution associated with the movement (for example, a mean time to be at a particular position, with a Gaussian distribution around the mean with a variance of some amount of time).

In some aspects, the motion state configuration may include timing information associated with determining the position of mobile device 510. In some aspects, the timing information may be absolute timing information. The absolute timing information may include information that identifies a particular time (for example, 12 a.m. on Jan. 1, 2019) relative to which a timing, associated with a position of mobile device 510 as determined by positioning device 505, is to be measured. Alternatively, the timing information may indicate that timing of the movement of mobile device 510 is to be measured relative to a start time of the movement.

In a fourth operation 556, positioning device 505 may identify the motion state configuration. In some aspects, positioning device 505 may identify the motion state configuration based at least in part on receiving the motion state configuration from control device 515. For example, control device 515 may store or have access to the motion state configuration, and may provide the motion state configuration to positioning device 505 (for example, when the motion state configuration is configured on control device 515, before control device 515 commands mobile device 510 to begin the movement, or the like). Here, positioning device 505 may receive (and store) the motion state configuration from control device 515, and may identify the motion state configuration accordingly.

In some aspects, positioning device 505 may identify the motion state configuration based at least in part on receiving the motion state configuration from mobile device 510. For example, mobile device 510 may store or have access to the motion state configuration (for example, when control device 515 is configured to provide the motion state configuration to mobile device 510). Here, when mobile device 510 initiates the performance of the movement, mobile device 510 may identify the motion state configuration (for example, based at least in part on being stored on mobile device 510). Mobile device 510 may then provide the motion state configuration to positioning device 505 (for example, when mobile device 510 provides the position information to positioning device 505, or the like). Here, positioning device 505 may receive the motion state configuration from mobile device 510, and may identify the motion state configuration accordingly. In some aspects, positioning device 505 may receive the motion state configuration from another source, such as another control device 515 that configures a factory set-up and may communicate with, but is distinct from, control device 515 in that it does not initiate or trigger movements of mobile devices 510.

In a fifth operation 558, positioning device 505 may determine a position of mobile device 510 based at least in part on the motion state configuration. For example, positioning device 505 may receive the motion state configuration and the position information, as described above, and may determine a position of mobile device 510 based at least in part on the motion state configuration and the position information. In some aspects, accuracy of the position determined by positioning device 505 is improved through use of the motion state configuration. In some aspects, positioning device 505 may provide information that identifies the position of mobile device 510 to another device (for example, another mobile device 510) to inform the other device regarding the position of mobile device 510. The above process can be repeated for additional determinations of a position of mobile device 510.

In some aspects, an interface used to communicate the motion state configuration and the movement trigger may depend on a network topology. For example, positioning device 505 may be configured on a first base station, mobile device 510 may be configured on a UE, and control device 515 may be configured on a second base station. Here, control device 515 and positioning device 505 may communicate over an Xn interface, and mobile device 510 and positioning device 505 may communicate using radio resource control (RRC) signaling or using a protocol such as LPP. In some aspects, medium access control control element (MAC-CE)-based or downlink control information (DCI)-based configuration or triggering may be used.

In some aspects, the motion state configuration can be updated after one or more performances of the movement of mobile device 510 are completed. For example, positioning device 505 may determine (for example, based at least in part on sensor information provided by mobile device 510) an actual position (in other words, a true position) of mobile device 510 or actual timing information associated with the movement (for example, an actual time at which mobile device 510 was at given position during the movement). Here, positioning device 505 may update the motion state configuration based at least in part on the actual position or the actual timing information. As an example, positioning device 505 may modify (for example, decrease or increase) a threshold uncertainty for one or more possible positions on or within a path, surface, or volume associated with the movement, or may modify a timing uncertainty associated with a given position of the movement. As still another example, positioning device 505 may update a probability associated with a given set of possible positions. For example, when the possible positions include a first set of possible positions associated with a first path, surface, or volume and a second set of possible positions associated with a second path, surface, or volume, positioning device 505 may modify a probability associated with the first set of positions or the second set of possible positions based at least in part on computing an updated probability when taking into account the paths, surfaces, or volumes used by mobile device 510 during the one or more performances of the movement.

In some aspects, an error, associated with a position of mobile device 510 resulting from the movement of mobile device 510, can be identified based at least in part on the motion state configuration. For example, positioning device 505 may determine a position that differs from the set of possible positions, indicated by the motion state configuration, by a threshold amount. Here, if this difference in position is detected a threshold number of instances (for example, one instance, ten instances, or the like) or for a threshold duration of time (for example, if mobile device 510 is outside of the possible positions for five seconds), then positioning device 505 may identify an error associated with the movement of mobile device 510. In some aspects, positioning device 505 may update the motion state configuration in response to the error (for example, by increasing a threshold uncertainty associated with the movement). Additionally or alternatively, positioning device 505 may flag mobile device 510 as experiencing an error (such that mobile device 510 is scheduled for maintenance or error diagnosis).

Figure 6:
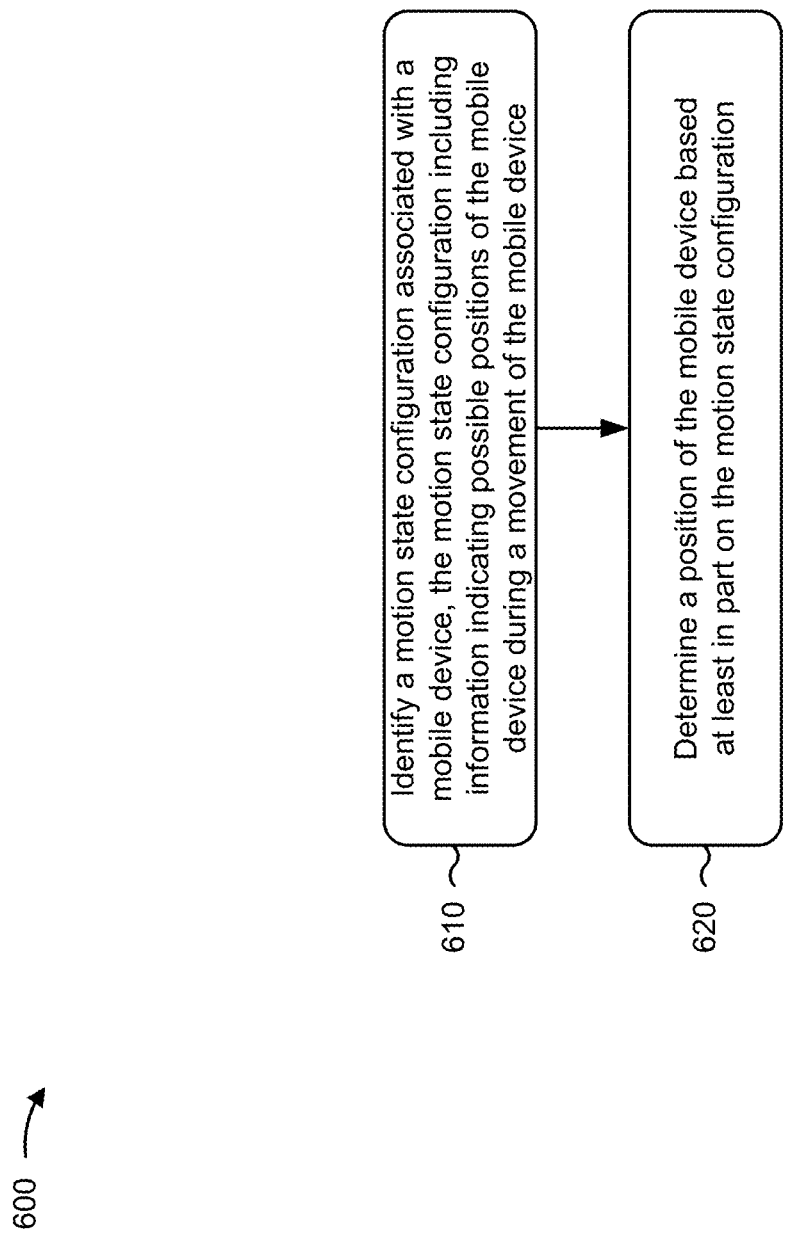
FIG. 6 is a diagram illustrating an example process performed by a positioning device in accordance with various aspects of the present disclosure.

FIG. 6 is a diagram illustrating an example process 600 performed, for example, by a positioning device, in accordance with various aspects of the present disclosure. Example process 600 is an example where a positioning device (for example, positioning device 505 configured on a UE 120, a base station 110, or the like) performs operations associated with enhanced reporting of positioning-related states.

As shown in FIG. 6, in some aspects, process 600 may include identifying a motion state configuration associated with a mobile device, the motion state configuration including information indicating possible positions of the mobile device during a movement of the mobile device (block 610). For example, the positioning device (for example, using receive processor 238, controller/processor 240, memory 242, or the like, when positioning device 505 is configured on a base station 110, using receive processor 258, controller/processor 280, memory 282, or the like, when positioning device 505 is configured on a UE 120) may identify a motion state configuration associated with a mobile device (for example, mobile device 510 configured on a UE 120, a base station 110, or the like), as described above. In some aspects, the motion state configuration may include information indicating possible positions of the mobile device during a movement of the mobile device, as described above.

As further shown in FIG. 6, in some aspects, process 600 may include determining a position of the mobile device based at least in part on the motion state configuration (block 620). For example, the positioning device (for example, using controller/processor 240, memory 242, or the like, when positioning device 505 is configured on a base station 110, using controller/processor 280, memory 282, or the like, when positioning device 505 is configured on a UE 120) may determine a position of the mobile device based at least in part on the motion state configuration, as described above.

Process 600 may include additional aspects, such as any single implementation or any combination of aspects described below or in connection with one or more other processes described elsewhere herein.

In a first additional aspect, the possible positions include positions within a threshold uncertainty from at least one path between a first point and a second point.

In a second additional aspect, in combination with the first aspect, the threshold uncertainty varies along the at least one path.

In a third additional aspect, alone or in combination with any one of the first and second aspects, the possible positions include positions within a threshold uncertainty from a two-dimensional surface.

In a fourth additional aspect, in combination with the third aspect, the threshold uncertainty varies across the two-dimensional surface.

In a fifth additional aspect, alone or in combination with any one or more of the first through fourth aspects, the possible positions include positions within a threshold uncertainty from one or more surfaces of a three-dimensional volume.

In a sixth additional aspect, in combination with the fifth aspect, the threshold uncertainty varies across one or more surfaces of the three-dimensional volume.

In a seventh additional aspect, alone or in combination with any one or more of the first through sixth aspects, a threshold uncertainty, associated with the possible positions, is defined by at least one of a confidence level associated with the possible positions, a confidence window associated with the possible positions, or a confidence distribution associated with the possible positions.

In an eighth additional aspect, alone or in combination with any one or more of the first through seventh aspects, the possible positions include a first set of possible positions associated with a first path, surface, or volume and a second set of possible positions associated with a second path, surface, or volume.

In a ninth additional aspect, in combination with the eighth aspect, the motion state configuration includes probability information associated with the first path, surface, or volume and probability information associated with the second path, surface, or volume.

In a tenth additional aspect, alone or in combination with any one or more of the first through ninth aspects, the motion state configuration includes information that identifies a timing uncertainty associated with the movement of the mobile device.

In an eleventh additional aspect, in combination with the tenth aspect, the timing uncertainty is defined by at least one of a confidence level associated with timing of the movement, a confidence window associated with the timing of the movement, or a confidence distribution associated with the timing of the movement.

In a twelfth additional aspect, alone or in combination with any one or more of the first through eleventh aspects, the motion state configuration is updated based at least in part on actual position information or actual timing information associated with the mobile device.

In a thirteenth additional aspect, alone or in combination with any one or more of the first through twelfth aspects, the positioning device may identify an error, associated with a position of the mobile device resulting from the movement of the mobile device, based at least in part on the motion state configuration.

In a fourteenth additional aspect, alone or in combination with any one or more of the first through thirteenth aspects, identifying the motion state configuration includes identifying the motion state configuration based at least in part on receiving the motion state configuration from a control device (for example, control device 515).

In a fifteenth additional aspect, alone or in combination with any one or more of the first through fourteenth aspects, identifying the motion state configuration includes identifying the motion state configuration based at least in part on receiving the motion state configuration from the mobile device.

In a sixteenth additional aspect, alone or in combination with any one or more of the first through fifteenth aspects, at least two of the positioning device, the mobile device, and a control device associated with controlling the movement of the mobile device are at least partially co-located on a same wireless communication device.

In a seventeenth additional aspect, alone or in combination with any one or more of the first through sixteenth aspects, the motion state configuration includes timing information associated with determining the position of the mobile device. Here, determining the position of the mobile device further includes determining the position based at least in part on the timing information.

In an eighteenth additional aspect, in combination with the seventeenth aspect, the timing information is absolute timing information.

In a nineteenth additional aspect, in combination with the seventeenth aspect, the timing information indicates that timing of the movement is relative to a start time of the movement.

In a twentieth additional aspect, alone or in combination with any one or more of the first through nineteenth aspects, the positioning device is at least partially configured on one or more of a base station (for example, base station 110), a UE (for example, UE 120), or a core network device; and the mobile device is configured on the UE.

In a twenty-first additional aspect, in combination with the twentieth aspect, a control device, associated with controlling the movement of the mobile device, is at least partially configured on one or more of the base station, another base station, the UE, the core network device, or another core network device.

In a twenty-second additional aspect, alone or in combination with any one or more of the first through twenty-first aspects, determining the position of the mobile device further includes determining the position of the mobile device further based at least in part on the position information.

Figure 7:
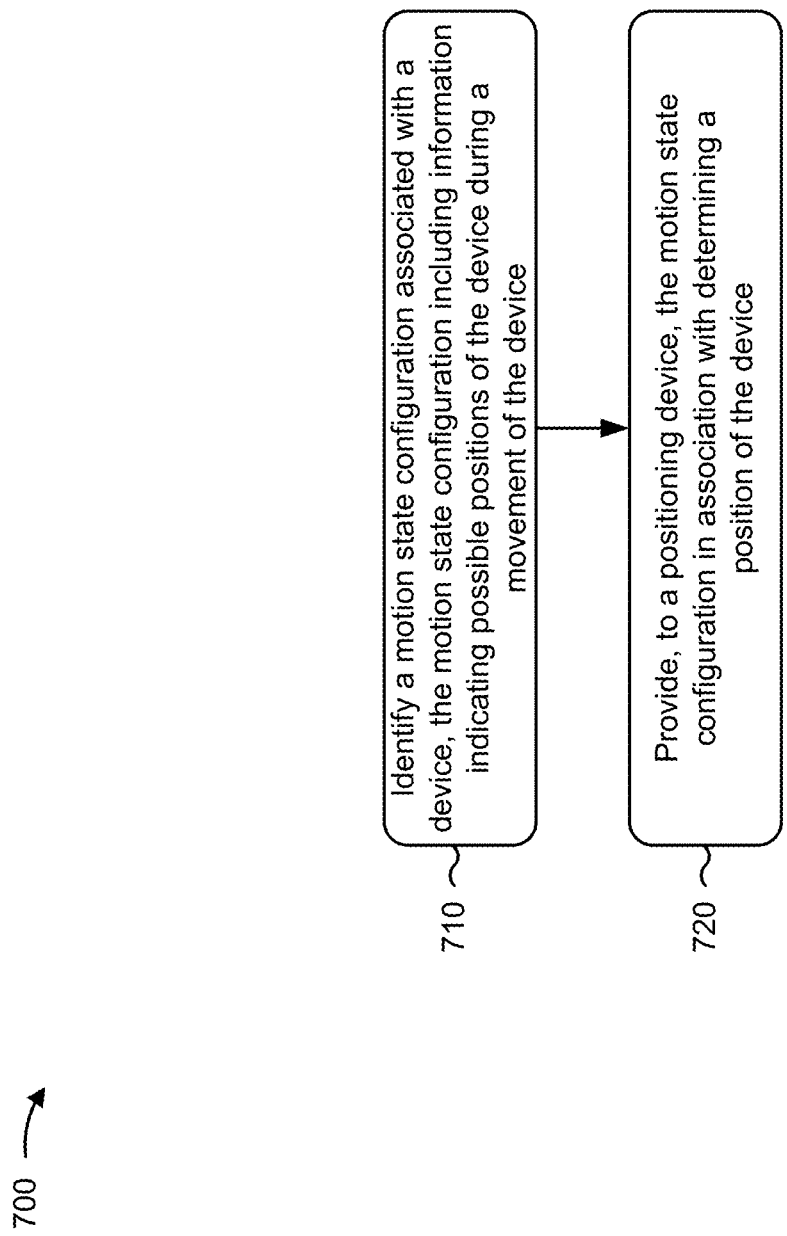
FIG. 7 is a diagram illustrating an example process performed by a mobile device in accordance with various aspects of the present disclosure.

FIG. 7 is a diagram illustrating an example process 700 performed, for example, by a mobile device, in accordance with various aspects of the present disclosure. Example process 700 is an example where a mobile device (for example, mobile device 510 configured on a UE 120, a base station 110, or the like) performs operations associated with enhanced reporting of positioning-related states.

As shown in FIG. 7, in some aspects, process 700 may include identifying a motion state configuration associated with the mobile device, the motion state configuration including information indicating possible positions of the mobile device during a movement of the mobile device (block 710). For example, the mobile device (for example, using receive processor 238, controller/processor 240, memory 242, or the like, when mobile device 510 is configured on a base station 110, using receive processor 258, controller/processor 280, memory 282, or the like, when mobile device 510 is configured on a UE 120) may identify a motion state configuration associated with the mobile device, as described above. In some aspects, the motion state configuration may include information indicating possible positions of the mobile device during a movement of the mobile device, as described above.

As further shown in FIG. 7, in some aspects, process 700 may include providing, to a positioning device, the motion state configuration in association with determining a position of the mobile device (block 720). For example, the mobile device (for example, using controller/processor 240, memory 242, or the like, when mobile device 510 is configured on a base station 110, using controller/processor 280, memory 282, or the like, when mobile device 510 is configured on a UE 120) may provide, to a positioning device (for example, positioning device 505 configured on a UE 120, a base station 110, or the like), the motion state configuration in association with determining a position of the mobile device, as described above.

Process 700 may include additional aspects, such as any single implementation or any combination of aspects described below or in connection with one or more other processes described elsewhere herein.

In a first additional aspect, the possible positions include positions within a threshold uncertainty from at least one path between a first point and a second point.

In a second additional aspect, in combination with the first aspect, the threshold uncertainty varies along the at least one path.

In a third additional aspect, alone or in combination with any one of the first and second aspects, the possible positions include positions within a threshold uncertainty from a two-dimensional surface.

In a fourth additional aspect, in combination with the third aspect, the threshold uncertainty varies across the two-dimensional surface.

In a fifth additional aspect, alone or in combination with any one or more of the first through fourth aspects, the possible positions include positions within a threshold uncertainty from one or more surfaces of a three-dimensional volume.

In a sixth additional aspect, in combination with the fifth aspect, the threshold uncertainty varies across one or more surfaces of the three-dimensional volume.

In a seventh additional aspect, alone or in combination with any one or more of the first through sixth aspects, a threshold uncertainty, associated with the possible positions, is defined by at least one of a confidence level associated with the possible positions, a confidence window associated with the possible positions, or a confidence distribution associated with the possible positions.

In an eighth additional aspect, alone or in combination with any one or more of the first through seventh aspects, the possible positions include a first set of possible positions associated with a first path, surface, or volume and a second set of possible positions associated with a second path, surface, or volume.

In a ninth additional aspect, in combination with the eighth aspect, the motion state configuration includes probability information associated with the first path, surface, or volume and probability information associated with the second path, surface, or volume.

In a tenth additional aspect, alone or in combination with any one or more of the first through ninth aspects, the motion state configuration includes information that identifies a timing uncertainty associated with the movement of the mobile device.

In an eleventh additional aspect, in combination with the tenth aspect, the timing uncertainty is defined by at least one of a confidence level associated with timing of the movement, a confidence window associated with the timing of the movement, or a confidence distribution associated with the timing of the movement.

In a twelfth additional aspect, alone or in combination with any one or more of the first through eleventh aspects, the motion state configuration is updated based at least in part on actual position information or actual timing information associated with the mobile device.

In a thirteenth additional aspect, alone or in combination with any one or more of the first through twelfth aspects, the positioning device may identify an error, associated with a position of the mobile device resulting from the movement of the mobile device, based at least in part on the motion state configuration.

In a fourteenth additional aspect, alone or in combination with any one or more of the first through thirteenth aspects, identifying the motion state configuration includes identifying the motion state configuration based at least in part on receiving the motion state configuration from a control device (for example, control device 515).

In a fifteenth additional aspect, alone or in combination with any one or more of the first through fourteenth aspects, at least two of the positioning device, the mobile device, and a control device associated with controlling the movement of the mobile device are at least partially co-located on a same wireless communication device.

In a sixteenth additional aspect, alone or in combination with any one or more of the first through fifteenth aspects, the motion state configuration includes timing information associated with determining the position of the mobile device. Here, determining the position of the mobile device further includes determining the position based at least in part on the timing information.

In a seventeenth additional aspect, in combination with the sixteenth aspect, the timing information is absolute timing information.

In an eighteenth additional aspect, in combination with the sixteenth aspect, the timing information indicates that timing of the movement is relative to a start time of the movement.

In a nineteenth additional aspect, alone or in combination with any one or more of the first through eighteenth aspects, the positioning device is at least partially configured on one or more of a base station (for example, base station 110), a UE (for example, UE 120), or a core network device; and the mobile device is configured on the UE.

In a twentieth additional aspect, in combination with the nineteenth aspect, a control device, associated with controlling the movement of the mobile device, is at least partially configured on one or more of the base station, another base station, the UE, the core network device, or another core network device.

In a twenty-first additional aspect, alone or in combination with any one or more of the first through twentieth aspects, determining the position of the mobile device further includes determining the position of the mobile device further based at least in part on the position information.

In a twenty-second additional aspect, alone or in combination with any one or more of the first through twenty-first aspects, the control device is at least partially configured on one or more of a base station, a first UE, or a core network device, the mobile device is at least partially configured on one or more of the first base station, a second base station, the first UE, a second UE, the first core network device, or a second core network device, and the positioning device is at least partially configured on one or more of the first base station, the second base station, a third base station, the first UE, the second UE, a third UE, the first core network device, the second core network device, or a third core network device.

Figure 8:
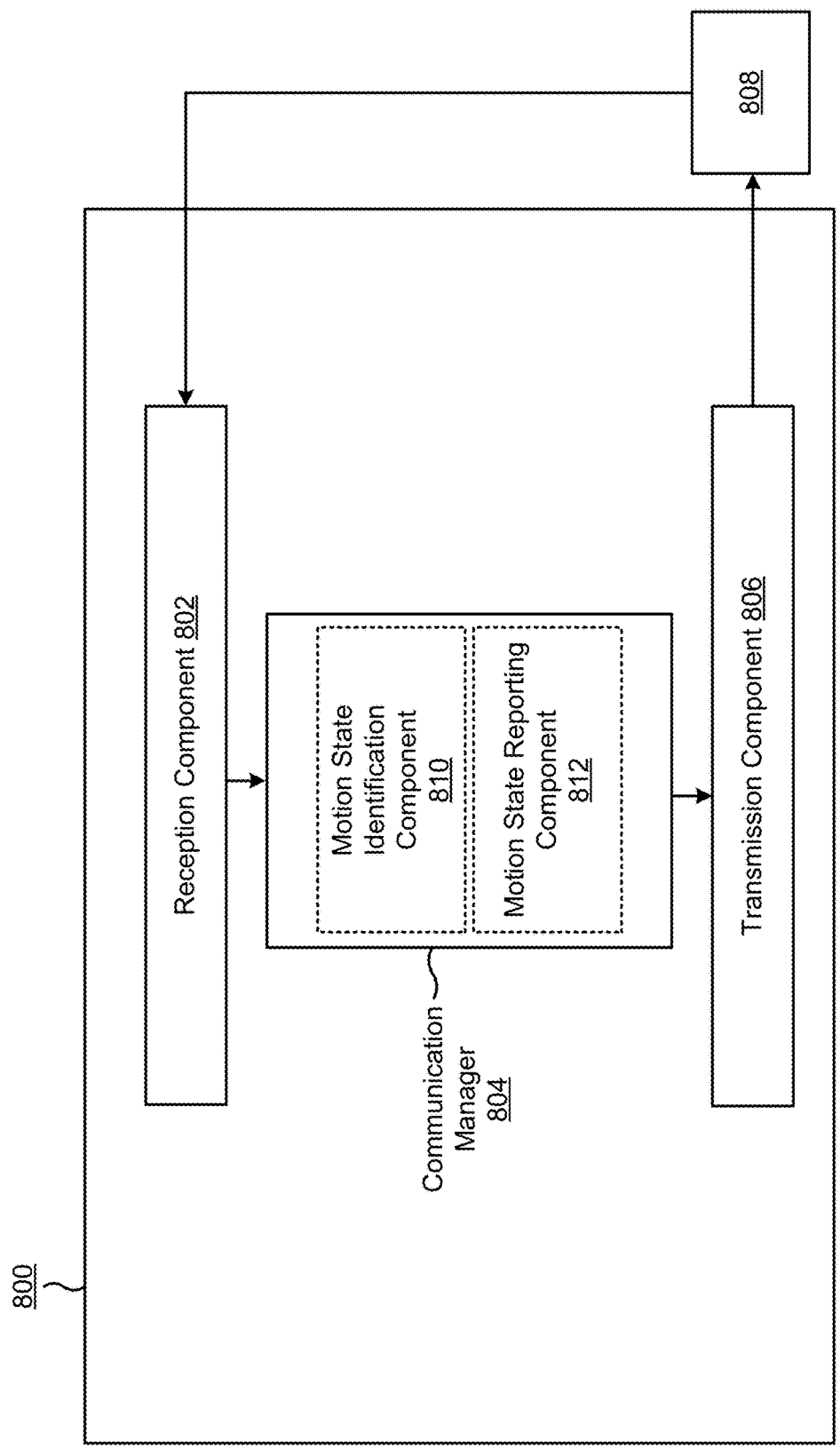
FIG. 8 is a block diagram of an example apparatus for wireless communication.

FIG. 8 is a block diagram of an example apparatus 800 for wireless communication. The apparatus 800 may be a mobile device, or a mobile device may include the apparatus 800. In some aspects, the apparatus 800 includes a reception component 802, a communication manager 804, and a transmission component 806, which may be in communication with one another (for example, via one or more buses). As shown, the apparatus 800 may communicate with another apparatus 808 (such as a positioning device, a UE, a base station, or another wireless communication device) using the reception component 802 and the transmission component 806.

In some aspects, the apparatus 800 may be configured to perform one or more operations described herein in connection with FIG. 5. Additionally or alternatively, the apparatus 800 may be configured to perform one or more processes described herein, such as process 700 of FIG. 7, or a combination thereof. In some aspects, the apparatus 800 may include one or more components of the UE described above in connection with FIG. 2.

The reception component 802 may receive communications, such as reference signals, control information, data communications, or a combination thereof, from the apparatus 808. The reception component 802 may provide received communications to one or more other components of the apparatus 800, such as the communication manager 804. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the UE described above in connection with FIG. 2.

The transmission component 806 may transmit communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the UE described above in connection with FIG. 2. In some aspects, the transmission component 806 may be collocated with the reception component 802 in a transceiver.

The communication manager 804 may identify a motion state configuration associated with the mobile device, the motion state configuration including information indicating possible positions of the mobile device during a movement of the mobile device; and provide, to a positioning device, the motion state configuration in association with determining a position of the mobile device. In some aspects, the communication manager 804 may include a controller/processor, a memory, or a combination thereof, of the UE described above in connection with FIG. 2.

In some aspects, the communication manager 804 may include a set of components, such as a motion state identification component 810, a motion state reporting component 812, or a combination thereof. Alternatively, the set of components may be separate and distinct from the communication manager 804. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The motion state identification component 810 may identify a motion state configuration associated with the mobile device, the motion state configuration including information indicating possible positions of the mobile device during a movement of the mobile device. The motion state reporting component 812 may provide, to a positioning device, the motion state configuration in association with determining a position of the mobile device.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
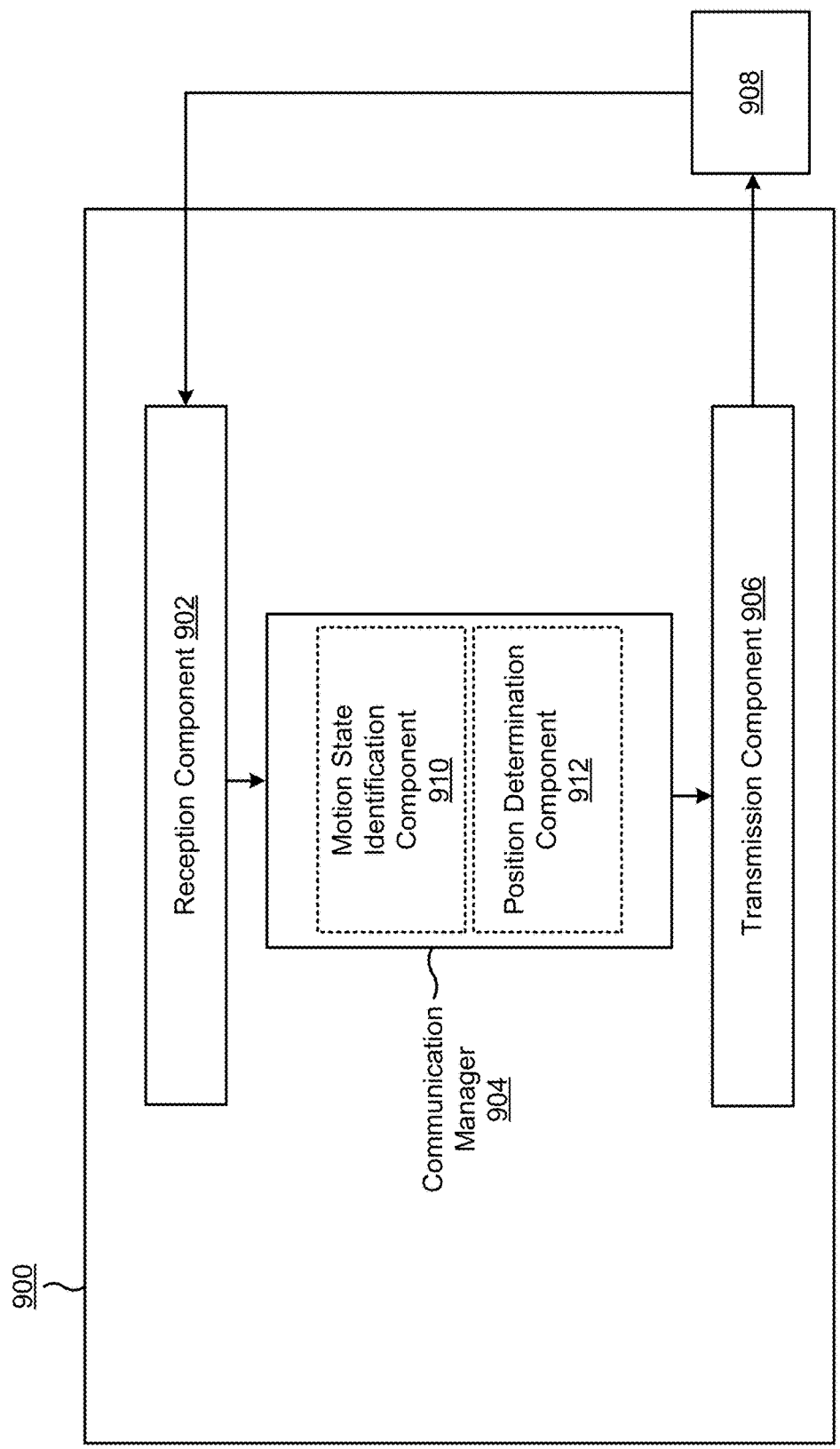
FIG. 9 is a block diagram of an example apparatus for wireless communication.

FIG. 9 is a block diagram of an example apparatus 900 for wireless communication. The apparatus 900 may be a positioning device, or a positioning device may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a mobile device, a UE, a base station, or another wireless communication device) using the reception component 902 and the transmission component 906.

In some aspects, the apparatus 900 may be configured to perform one or more operations described herein in connection with FIG. 5. Additionally or alternatively, the apparatus 900 may be configured to perform one or more processes described herein, such as process 600 of FIG. 6, or a combination thereof. In some aspects, the apparatus 900 may include one or more components of the UE or the base station device described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE or the base station device described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the UE or the base station device described above in connection with FIG. 2. In some aspects, the transmission component 906 may be collocated with the reception component 902 in a transceiver.

The communication manager 904 may identify a motion state configuration associated with a mobile device, the motion state configuration including information indicating possible positions of the mobile device during a movement of the mobile device, and determine a position of the mobile device based at least in part on the motion state configuration. In some aspects, the communication manager 904 may include a controller/processor, a memory, or a combination thereof, of the UE or the base station device described above in connection with FIG. 2.

In some aspects, the communication manager 904 may include a set of components, such as a motion state identification component 910, a position determination component 912, or a combination thereof. Alternatively, the set of components may be separate and distinct from the communication manager 904. In some aspects, one or more components of the set of components may include or may be implemented within a controller/processor, a memory, or a combination thereof, of the UE or the base station device described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The motion state identification component 910 may identify a motion state configuration associated with a mobile device, the motion state configuration including information indicating possible positions of the mobile device during a movement of the mobile device. The position determination component 912 may determine a position of the mobile device based at least in part on the motion state configuration.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a first device, comprising:
   identifying a motion state configuration associated with a second device, the motion state configuration including information available independent of using a sensor and indicating possible positions of the second device during a controlled movement of the second device along a configured path, within a configured surface, or within a configured volume; and
   providing, to a positioning device, the motion state configuration in association with determining a position of the second device,
      the motion sate configuration provided to the position device including the information indicating the possible positions, and
      the possible positions including positions within a threshold uncertainty from the configured path, the configured surface, or the configured volume on which the second device is controlled to move.

2. The method of claim 1, wherein the threshold uncertainty varies along the configured path, across the configured surface, or across the configured volume.

3. The method of claim 1, wherein a set of positions, of the possible positions, includes positions on at least one of:
   a one-dimensional path,
   a two-dimensional surface,
   a three-dimensional volume,
   a boundary of the configured surface, or
   a boundary of the configured volume.

4. The method of claim 1, wherein the threshold uncertainty is defined by at least one of a confidence level associated with the possible positions, a confidence window associated with the possible positions, or a confidence distribution associated with the possible positions.

5. The method of claim 1, wherein the possible positions include a first set of possible positions associated with a first path, surface, or volume and a second set of possible positions associated with a second path, surface, or volume.

6. The method of claim 5, wherein the motion state configuration includes probability information associated with the first path, surface, or volume and probability information associated with the second path, surface, or volume.

7. The method of claim 1, wherein the motion state configuration includes information that identifies a timing uncertainty associated with the controlled movement of the second device.

8. The method of claim 7, wherein the timing uncertainty is defined by at least one of a confidence level associated with timing of the controlled movement, a confidence window associated with the timing of the controlled movement, or a confidence distribution associated with the timing of the controlled movement.

9. The method of claim 1, further comprising updating the motion state configuration after one or more performances of the controlled movement of the second device are completed, wherein the motion state configuration is updated based at least in part on actual position information or actual timing information associated with the second device.

10. The method of claim 1, further comprising identifying an error, associated with a position of the second device resulting from the controlled movement of the second device, based at least in part on the motion state configuration.

11. The method of claim 1, wherein the motion state configuration is provided via the second device.

12. The method of claim 1, wherein at least two of the positioning device, the second device, and the first device are at least partially co-located on a same wireless communication device.

13. The method of claim 1, wherein the motion state configuration includes timing information associated with determining the position of the second device, wherein determining the position of the second device further comprises determining the position based at least in part on the timing information.

14. The method of claim 13, wherein the timing information is absolute timing information.

15. The method of claim 13, wherein the timing information indicates that timing of the controlled movement is relative to a start time of the controlled movement.

16. The method of claim 1, wherein:
   the first device is at least partially configured on one or more of a base station, a first user equipment (UE), or a first core network device,
   the second device is at least partially configured on one or more of the first base station, a second base station, the first UE, a second UE, the first core network device, or a second core network device, and
   the positioning device is at least partially configured on one or more of the first base station, the second base station, a third base station, the first UE, the second UE, a third UE, the first core network device, the second core network device, or a third core network device.

17. The method of claim 1, further comprising providing position information to the positioning device in association with determining the position of the second device based at least in part on the motion state configuration and the position information.

18. A method of wireless communication performed by a positioning device, comprising:
identifying a motion state configuration associated with a mobile device, the motion state configuration including information available independent of using a sensor and indicating possible positions of the mobile device during a controlled movement of the mobile device along a configured path, within a configured surface, or within a configured volume,
the possible positions including positions within a threshold uncertainty from the configured path, the configured surface, or the configured volume on which the mobile device is controlled to move; and
determining a position of the mobile device based at least in part on the motion state configuration.

19. The method of claim 18, wherein the threshold uncertainty varies along the configured path, across the configured surface, or across the configured volume.

20. The method of claim 18, wherein a set of positions, of the possible positions, includes positions on at least one of:
a one-dimensional path,
a two-dimensional surface,
a three-dimensional volume,
a boundary of the configured surface, or
a boundary of the configured volume.

21. The method of claim 18, wherein the threshold uncertainty is defined by at least one of a confidence level associated with the possible positions, a confidence window associated with the possible positions, or a confidence distribution associated with the possible positions.

22. The method of claim 18, wherein the possible positions include a first set of possible positions associated with a first path, surface, or volume and a second set of possible positions associated with a second path, surface, or volume.

23. The method of claim 18, wherein the motion state configuration includes information that identifies a timing uncertainty associated with the controlled movement of the mobile device.

24. The method of claim 18, further comprising updating the motion state configuration after one or more performances of the controlled movement of the mobile device are completed, wherein the motion state configuration is updated based at least in part on actual position information or actual timing information associated with the mobile device.

25. The method of claim 18, wherein the motion state configuration includes timing information associated with determining the position of the mobile device, wherein determining the position of the mobile device further comprises determining the position based at least in part on the timing information.

26. The method of claim 18, further comprising receiving position information provided by the mobile device, wherein determining the position of the mobile device further comprises determining the position of the mobile device further based at least in part on the position information.

27. A first device for wireless communication, comprising:
a memory; and
one or more processors operatively coupled to the memory, the memory and the one or more processors configured to:
identify a motion state configuration associated with a second device, the motion state configuration including information available independent of using a sensor and indicating possible positions of the second device during a controlled movement of the second device along a configured path, within a configured surface, or within a configured volume; and
provide, to a positioning device, the motion state configuration in association with determining a position of the second device,
the motion sate configuration provided to the position device including the information indicating the possible positions, and
the possible positions including positions within a threshold uncertainty from the configured path, the configured surface, or the configured volume on which the second device is controlled to move.

28. A positioning device for wireless communication, comprising:
a memory; and
one or more processors operatively coupled to the memory, the memory and the one or more processors configured to:
identify a motion state configuration associated with a mobile device, the motion state configuration including information available independent of using a sensor and indicating possible positions of the mobile device during a controlled movement of the mobile device along a configured path, within a configured surface, or within a configured volume,
the possible positions including positions within a threshold uncertainty from the configured path, the configured surface, or the configured volume on which the mobile device is controlled to move; and
determine a position of the mobile device based at least in part on the motion state configuration.

29. The first device of claim 27, wherein the threshold uncertainty varies along the configured path, across the configured surface, or across the configured volume.

30. The positioning device of claim 28, wherein the threshold uncertainty varies along the configured path, across the configured surface, or across the configured volume.

* * * * *